Dec. 26, 1933.    C. E. HATHORN    1,941,348
JOINT FITTING
Filed Nov. 7, 1931

INVENTOR
Charles E. Hathorn
BY his ATTORNEY

Patented Dec. 26, 1933

1,941,348

UNITED STATES PATENT OFFICE 1,941,348

JOINT FITTING

Charles E. Hathorn, Hempstead, N. Y., assignor to Curtiss Aeroplane & Motor Company, Inc., a corporation of New York Application November 7, 1931. Serial No. 573,596

3 Claims. (Cl. 287—100)

The present invention relates to joint fittings and has for an object to provide means for forming a rigid connection between various parts of airplanes.

Another object of the present invention is to provide a rigid connection between the fuselage and wings (cantilever type) of airplanes, or for rigidly joining the halves of cantilever horizontal stabilizers or wing panels and at the same time permitting the easy and quick dismounting of the surfaces mentioned, if and when required, and with the assurance that they may be again assembled with a rigid joint.

A further object of the present invention is to provide a device of this kind which is capable of adjustment to compensate for wear of the parts joined together so that at all times a rigid connection is maintained between the joined parts.

A still further object of the present invention is to provide means for obtaining the above enumerated results comprising in general a bolt having a tapered head and a tapered nut adapted to have a driving fit with the connected parts. The bolt head and the nut may have the same size taper, in which case the bolt may be inserted from either side of the fittings. However, the invention is not limited in this respect since the tapers may be of different sizes and equally good results obtained.

Another object of the present invention is to provide a device of this kind comprising few and simple parts and to eliminate the use of tapered sleeves, washers or other unnecessary elements.

While the present improvement is described as applied to parts of an airplane, however, it is not restricted to such use, but may be advantageously employed wherever it is desired to join two or more members together. The joint fitting may also be used for securing the engine mount to the fuselage.

Further objects will be apparent from a reading of the subjoined specification and claims and from a consideration of the accompanying drawing.

In order to explain the invention more clearly, one embodiment thereof is shown in said drawing, in which.

Figure 1:
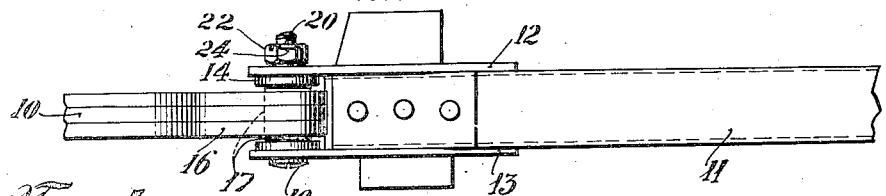
Fig. 1 is a plan view of two members of an airplane joined together showing the improved joint fitting applied and with parts broken away.
Figure 2:
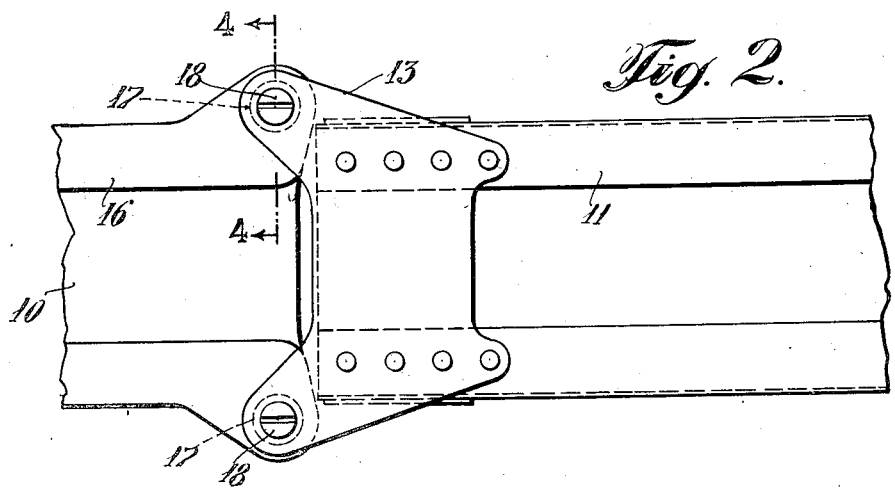
Fig. 2 is a side elevation of the same.
Figure 3:
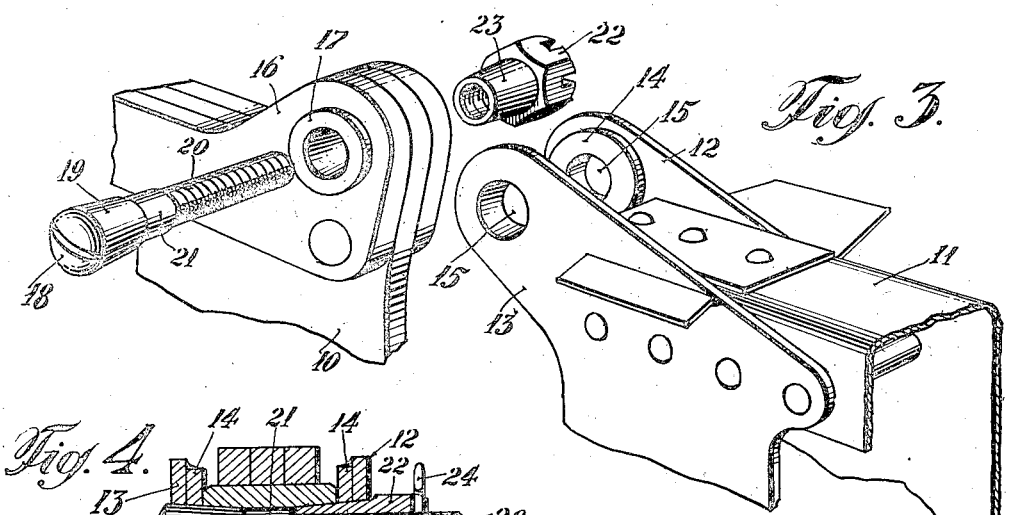
Fig. 3 illustrates, detached and in detail, two members adapted to be joined together, and the joint fitting with parts broken away.

Referring more particularly to the drawing, a portion of a fuselage of an airplane is represented at 10 and a portion of an airplane wing is illustrated at 11. The wing 11 is provided with a pair of spaced apart lugs 12 and 13 having bosses 14 on their inner opposed faces and the lugs 12 and 13, and the bosses 14 are provided with aligned openings 15.

The fuselage 10 is provided with an apertured ear 16 in the opening of which is rigidly carried a sleeve 17 having its opposite ends extending beyond the sides of the ear 16. The sleeve 17 may be formed integral with the ear 16 or it may be rigidly secured thereto in any other appropriate manner.

The lugs 12 and 13 receive the ear 16 therebetween and the openings in the lugs and the ear are disposed in alignment while the inner faces of the bosses 14 abut the respective ends of the sleeve 17 when the fuselage and the wing are in assembled relation.

The means for detachably securing the parts 10 and 11 in assembled relation comprises a bolt 18 having a smooth inwardly tapered head 19, a threaded end 20 and an intermediate substantially straight portion 21. The straight portion 21 preferably has a diameter smaller than that of the inner end of the tapered head 19 of the bolt 18, but may have a diameter equal in size to that of the inner end of the tapered head 19. A nut 22 having an internally screw-threaded tapered collar 23 is provided to cooperate with said bolt 18 to hold the assembled parts in position. The taper of the collar 23 is preferably of the same size as the taper of the bolt head 19. However, the tapers of these two members may be of sizes one different from the other. The collar 23 is preferably formed integral with the nut 22, or is rigidly fastened thereto.

The bolt head 19 is provided with the usual kerf for the reception of a screw driver or other tool used to tighten up the bolt and the nut 22 has a plurality of flat sides to receive a wrench or the like to tighten up the nut. The nut 22 is also castellated to receive a locking pin 24 which also passes through a suitable opening in the threaded end 20 of the bolt 18.

Figure 4:
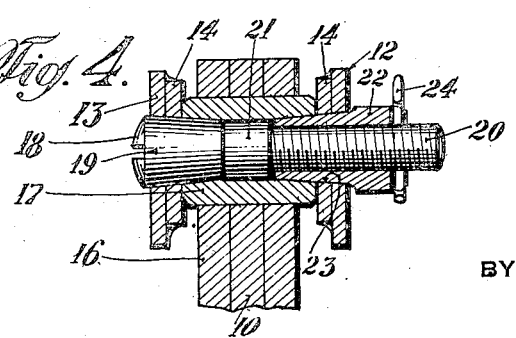
Fig. 4 is a vertical section of one of the joints taken on the line 4—4 of Fig. 2 and looking in the direction of the arrows.

The operation of the device is as follows: The members 10 and 11 are assembled with the lugs 12 and 13 receiving the apertured ear 16 therebetween so that the openings in the lugs and ear are in alignment, the bolt 18 is then inserted from either side into and through said openings and the threaded end 20 of the bolt 18 projects beyond the side of one of the lugs and this projected end of the bolt receives the nut 22 with its tapered collar 23 extended inwardly toward said lug. The nut 22 is then tightened up until the tapered collar 23 has a driving fit with the sleeve 17, the boss 14 and the lug 12 and the tapered head 19 of the bolt 18 has a driving fit with the sleeve 17, the lug 13 and its boss 14, while the straight portion 21 of the bolt 18 engages the intermediate portion of the sleeve 17, as may be seen by referring to Fig. 4.

It is thus apparent that the members 10 and 11 are rigidly joined together solely by the bolt 18 and nut 22 and that all tapered sleeves, washers or other extra parts are eliminated. This greatly reduces the weight of the fastening means and effects a great saving in manufacture and decreases the chances of losing the parts since there are only two parts needed, namely, the bolt and the nut.

It is to be understood that the above described embodiment of the invention is for the purpose of illustration only, and various changes may be made therein without departing from the spirit and scope of the invention.

I claim as my invention:

1. In airplane construction, a wing hinge assembly comprising a fuselage member having a transverse opening therein, a sleeve rigidly held in said opening, a wing spar having transverse openings in the opposite sides of the end thereof, the said openings being so positioned as to be in alignment with said sleeve when in assembled relation, a bolt having a tapered head adapted to pass through one of said openings and into said sleeve, and a nut adapted to engage said bolt, said nut having a tapered collar adapted to extend through the other of said openings and into the opposite end of said sleeve, so that when the nut is tightened on said bolt, the tapered head of the bolt has a driving fit in one of said openings and said sleeve, and the tapered collar of said nut has a driving fit in the other of said openings and the opposite end of said sleeve.

2. In airplane construction, a wing hinge assembly comprising a fuselage member having a transverse opening therein, a sleeve rigidly held in said opening, the ends of said sleeve extending beyond the sides of said member, a wing spar having transverse openings in the opposite sides of the ends thereof and bosses integrally formed therewith, the said openings passing through the said bosses which are so positioned as to bear against the opposite ends of the said sleeve when in assembled relation, a bolt having a tapered head adapted to pass through one of said openings and into said sleeve, the said bolt passing through said sleeve and through the other of said openings, and a nut adapted to engage said bolt, having a tapered collar adapted t extend through the other of said openings and into the opposite end of said sleeve, so that when the nut is tightened on said bolt the tapered head of the bolt has a driving fit in one of said openings and said sleeve, and the tapered collar of said nut has a driving fit with the other of said openings and the opposite end of said sleeve.

3. In airplane construction, a wing hinge assembly comprising a fuselage member having a transverse opening therein, a sleeve rigidly held in said opening, the ends of said sleeve projecting beyond the sides of said member, a wing spar having spaced lugs in parallel relationship extending from the end thereof, the said lugs having bosses integrally formed therewith on the inner faces thereof and openings passing through the said bosses, said bosses being so positioned as to bear against the opposite ends of said sleeve when said openings are aligned therewith, a bolt having a tapered head which passes through one of said openings and into said sleeve, the said bolt passing through said sleeve and through the other of said openings, and a nut adapted to engage said bolt, said nut having a tapered collar which extends through the other of said openings and into the opposite end of said sleeve, so that when the nut is tightened on said bolt, the tapered head of the bolt has a driving fit with one of said lugs, the boss formed on the face thereof, and said sleeve, and the tapered collar of said nut has a driving fit with the other of said lugs, the boss formed on the face thereof, and the opposite end of said sleeve.

CHARLES E. HATHORN.